US011548093B2

(12) United States Patent
Greenberg et al.

(10) Patent No.: US 11,548,093 B2
(45) Date of Patent: Jan. 10, 2023

(54) LASER APPARATUS FOR CUTTING BRITTLE MATERIAL

(71) Applicant: Coherent, Inc., Santa Clara, CA (US)

(72) Inventors: Michael R. Greenberg, Santa Rosa, CA (US); David M. Gaudiosi, Petaluma, CA (US); Jochen Deile, Santa Rosa, CA (US)

(73) Assignee: Coherent, Inc., Santa Clara, CA (US)

( * ) Notice: Subject to any disclaimer, the term of this patent is extended or adjusted under 35 U.S.C. 154(b) by 261 days.

(21) Appl. No.: 16/860,300

(22) Filed: Apr. 28, 2020

(65) Prior Publication Data

US 2020/0254564 A1   Aug. 13, 2020

Related U.S. Application Data

(63) Continuation of application No. 15/352,385, filed on Nov. 15, 2016, now Pat. No. 10,668,561.

(51) Int. Cl.
*B23K 26/06* (2014.01)
*B23K 26/073* (2006.01)
(Continued)

(52) U.S. Cl.
CPC ...... *B23K 26/0648* (2013.01); *B23K 26/0006* (2013.01); *B23K 26/066* (2015.10);
(Continued)

(58) Field of Classification Search
CPC ............ B23K 26/0006; B23K 26/0057; B23K 26/0069; B23K 26/03; B23K 26/032;
(Continued)

(56) References Cited

U.S. PATENT DOCUMENTS 7,638,730 B2* 12/2009 Yoo ..................... C03B 33/093
                                                      219/121.73
9,102,007 B2   8/2015 Hosseini
(Continued)

FOREIGN PATENT DOCUMENTS

JP       2015-119076 A    6/2015
JP       2016509540 A     3/2016
(Continued)

OTHER PUBLICATIONS

Office Action received for European Patent Application No. 17804775. 9, dated Sep. 7, 2020, 5 pages.
(Continued)

*Primary Examiner* — Hung D Nguyen
(74) *Attorney, Agent, or Firm* — Morrison & Foerster LLP

(57) ABSTRACT

An apparatus for cutting brittle material comprises an aspheric focusing lens, an aperture, and a laser-source generating a beam of pulsed laser-radiation. The aspheric lens and the aperture form the beam of pulsed laser-radiation into an elongated focus having a uniform intensity distribution along the optical axis of the aspheric focusing lens. The elongated focus extends through the full thickness of a workpiece made of a brittle material. The workpiece is cut by tracing the optical axis along a cutting line. Each pulse or burst of pulsed laser-radiation creates an extended defect through the full thickness of the workpiece.

20 Claims, 8 Drawing Sheets

(51) Int. Cl.
| | |
|---|---|
| *B23K 26/00* | (2014.01) |
| *B23K 26/53* | (2014.01) |
| *B23K 26/066* | (2014.01) |
| *B23K 26/0622* | (2014.01) |
| *B23K 26/08* | (2014.01) |
| *B23K 26/402* | (2014.01) |
| *C03B 33/02* | (2006.01) |
| *G02B 27/09* | (2006.01) |
| *G02B 27/30* | (2006.01) |
| *B23K 103/00* | (2006.01) |

(52) U.S. Cl.
CPC ...... *B23K 26/0624* (2015.10); *B23K 26/0738* (2013.01); *B23K 26/083* (2013.01); *B23K 26/402* (2013.01); *B23K 26/53* (2015.10); *C03B 33/0222* (2013.01); *G02B 27/0955* (2013.01); *G02B 27/30* (2013.01); *B23K 2103/54* (2018.08); *Y02P 40/57* (2015.11)

(58) Field of Classification Search
CPC .............. B23K 26/042; B23K 26/0608; B23K 26/0613; B23K 26/0624; B23K 26/063; B23K 26/0648; B23K 26/066; B23K 26/0676; B23K 26/0738; B23K 26/083; B23K 26/18; B23K 26/361; B23K 26/38; B23K 26/382; B23K 26/40; B23K 26/402; B23K 26/4025; B23K 26/53; B23K 26/55; B23K 2103/54; G02B 27/0955; G02B 27/30; C03B 33/0222; Y02P 40/57
USPC .............. 219/121.6, 121.61, 121.67, 121.73, 219/121.75, 121.78
See application file for complete search history.

(56) References Cited

U.S. PATENT DOCUMENTS

| | | | |
|---|---|---|---|
| 2007/0170159 A1 | 7/2007 | Fukumitsu et al. | |
| 2011/0132885 A1 | 6/2011 | Sercel et al. | |
| 2011/0194106 A1 | 8/2011 | Murakami et al. | |
| 2011/0274128 A1 | 11/2011 | Fukumitsu et al. | |
| 2012/0000894 A1* | 1/2012 | Abramov ........... | B23K 26/0869 219/121.67 |
| 2012/0234807 A1 | 9/2012 | Sercel et al. | |
| 2013/0068738 A1* | 3/2013 | Schurmann ............ | B23K 26/03 219/121.67 |
| 2013/0277341 A1* | 10/2013 | Dvorkin .............. | B23K 26/0676 219/121.67 |
| 2014/0027951 A1 | 1/2014 | Srinivas et al. | |
| 2014/0199519 A1 | 7/2014 | Schillinger et al. | |
| 2014/0340730 A1 | 11/2014 | Bergh et al. | |
| 2015/0034613 A1 | 2/2015 | Hosseini | |
| 2015/0136743 A1* | 5/2015 | Hosseini ............... | C03B 33/091 219/121.61 |
| 2015/0165562 A1* | 6/2015 | Marjanovic ............. | B32B 17/06 219/121.61 |
| 2015/0165563 A1 | 6/2015 | Manley et al. | |
| 2015/0360991 A1 | 12/2015 | Grundmueller et al. | |
| 2016/0047956 A1 | 2/2016 | Tabirian et al. | |
| 2017/0313617 A1* | 11/2017 | Greenberg ............ | C03B 33/091 |

FOREIGN PATENT DOCUMENTS

| | | |
|---|---|---|
| JP | 2016113358 A | 6/2016 |
| KR | 20110112282 A | 10/2011 |
| KR | 20150016177 A | 2/2015 |
| KR | 20160010397 A | 1/2016 |
| WO | 2016/059449 A1 | 4/2016 |

OTHER PUBLICATIONS

International Preliminary Report on Patentability received for PCT Patent Application No. PCT/US2017/061386, dated May 31, 2019, 8 pages.
Final Office Action received for U.S. Appl. No. 15/352,385, dated Oct. 17, 2019, 11 pages.
International Search Report and Written Opinion received for PCT Patent Application No. PCT/US2017/061386, dated Apr. 5, 2018, 12 pages.
Non-Final Office Action received for U.S. Appl. No. 15/352,385, dated Mar. 19, 2019, 13 pages.
Notice of Allowance received for U.S. Appl. No. 15/352,385, dated Jan. 29, 2020, 9 pages.
Brzobohatý et al., "High Quality Quasi-Bessel Beam Generated by Round-Tip Axicon", Optics Express, vol. 16, No. 17, Aug. 18, 2008, pp. 12688-12700.
Chen et al., "Axial intensity distribution of lens axicon illuminated by Gaussian-Schell model beam", Optical Engineering, vol. 46, No. 1, Jan. 2007, pp. 018003-1-018003-5.
Haloui et al., "U.S. Appl. No. 14/932,575, Titled "Filamentary Cutting of Brittle Materials Using a Picosecond Pulsed Laser" filed Nov. 4, 2015".
Minami Akihiko, "U.S. Appl. No. 15/007,045, Titled "Filamentary Cutting of Brittle Materials Using a Picosecond Pulsed Laser" filed Jan. 26, 2016".
Pu et al., "Intensity distribution of Gaussian beams focused by a lens with spherical aberration", Optics Communications, vol. 151, Issue 4-6., 1998, pp. 331-338.
Toytman et al., "Optical breakdown in transparent media with adjustable axial length and location", Optics Express 24688, vol. 18, No. 24., Nov. 2010, 11 pages.
Notice of Allowance received for Chinese Patent Application No. 201780069421.1, dated Jan. 14, 2022, 3 pages.
Notice of Allowance received for Japanese Patent Application No. 2019-524886, dated Mar. 17, 2022, 5 pages.
Office Action received for Chinese Patent Application No. 201780069421.1, dated Jul. 21, 2021, 12 pages.
Office Action received for Chinese Patent Application No. 201780069421.1, dated Nov. 25, 2020, 18 pages.
Office Action received for Japanese Patent Application No. 2019-524886, dated Feb. 3, 2022, 4 pages.
Office Action received for Japanese Patent Application No. 2019-524886, dated Sep. 24, 2021, 6 pages.
Office Action received for Korean Patent Application No. 10-2019-7016889, dated Nov. 4, 2021, 17 pages.

* cited by examiner

LASER APPARATUS FOR CUTTING BRITTLE MATERIAL

PRIORITY

This application is a continuation of U.S. patent Ser. No. 15/352,385, filed Nov. 15, 2016, the entire disclosure of which is incorporated herein by reference.

TECHNICAL FIELD OF THE INVENTION

The present invention relates in general to laser machining of transparent brittle materials. The invention relates in particular to cutting glass workpieces using a beam of ultra-short pulsed laser-radiation, having a pulse duration of about 20 picoseconds or less, formed into an elongated focus.

DISCUSSION OF BACKGROUND ART

Laser-machining is increasingly used for cutting, drilling, marking, and scribing a wide range of materials, including brittle materials such as glass and sapphire. Traditional mechanical machining produces unwanted defects, such as micro cracks that may propagate when the processed material is stressed, thereby degrading and weakening the processed material. Laser-machining of brittle materials using a focused beam of pulsed laser-radiation produces precise cuts and holes, having high-quality edges and walls, while minimizing the formation of unwanted defects. Industrial progress requires laser-machining of an increasing range of brittle materials, while demanding increased processing speed and precision.

Transparent brittle materials interact with focused beams of pulsed laser-radiation through non-linear absorption of the laser-radiation. The pulsed laser-radiation may comprise a train of individual pulses or rapid bursts of pulses. Each individual pulse or burst of pulses creates a defect in the transparent brittle material at the focus of the beam. An array of defects is created by translating the focused beam of pulsed laser-radiation along a cutting path in a workpiece, thereby weakening the material. A thin workpiece may then separate spontaneously, while a thick workpiece may be separated in an additional step that applies stress. One such method is to apply a laser-beam having a wavelength absorbed by the material along the cutting path, which causes mechanical stress through heating.

In recent years, chemically strengthened glass has been developed and is used extensively as a cover glass for display screens of consumer electronic devices. The chemical strengthening is achieved by an ion-exchange process. Silicate sheet glass is immersed in a salt solution containing potassium ions ($K^+$). Larger potassium ions substitute for smaller sodium ions ($Na^+$) located near surfaces of the glass, thereby causing compression within surface-layers in the glass. Between such surface-layers, the interior of the glass is in tension, compensating the surface compression. The high surface-layer compression makes chemically strengthened glass extremely hard (Mohs scale of about 6.5) and resistant to scratching and mechanical impacts. Sapphire (Mohs scale of 9) is an alternative hard cover glass material used in some devices.

Cover glass for consumer electronic devices typically has thickness between about 300 micrometers ($\mu m$) and 1.1 millimeters (mm). Well focused pulsed laser-radiation creates defects that typically extend for a few tens of micrometers in depth. Cutting through the full thickness of a workpiece requires the focused laser-radiation to be scanned along the cutting path many times while varying the depth-of-focus.

Commercial laser-machining processes have been developed using various means to generate long foci, thereby reducing the number of scans required along a cutting path and increasing the productivity of laser-cutting apparatus. A "Bessel beam" is generated from a beam having a Gaussian transverse mode using an axicon or an equivalent phase mask as the focusing element. An axicon is a conical prism that is rotationally symmetric about an optical axis. A phase mask is a type of diffractive optical element (DOE) and is generally rather expensive to fabricate. In practice, an additional telescope is often required to de-magnify a Bessel beam and eliminate severe intensity modulations caused by imperfect fabrication of the axicon or DOE. Defects created using a Bessel beam may have satellite structure, which can result in a poor quality cut edge.

An alternative way to generate long foci is to create a self-guiding "filament". A focused beam of pulsed laser-radiation having high intensity in a material becomes further focused due to non-linear components of the refractive index. Positive feedback between non-linear focusing and intensity creates a plasma. A lower refractive index within the plasma causes defocusing. A balance between the focusing and defocusing sustains a plasma state within a filament. Propagation of the filament creates a void in the material along the optical axis of the focusing element. Filament laser-machining requires high pulse energies, approaching the practical limits of the current generation of ultra-short pulsed laser-sources, and fine control of all beam parameters. Relatively small variances in material properties (such as normal material inhomogeneities) and beam parameters (such as shot-to-shot noise and laser-to-laser beam quality) can cause a loss of control in a filament laser-cutting process.

There is need for an efficient laser-cutting method that will cut strengthened glass or sapphire in a single pass along the cutting path that uses lower pulse energies. Preferably, the method should be deterministic and insensitive to variances in material properties and beam parameters.

SUMMARY OF THE INVENTION

The present invention is directed to cutting brittle material that has an entrance surface and an exit surface. Laser apparatus in accordance with the present invention comprises a laser-source delivering a collimated beam of pulsed laser-radiation. The pulsed laser-radiation has a pulse duration of less than about 20 picoseconds and the collimated beam has a first diameter. An aspheric focusing lens is provided that has an optical axis and a clear-aperture. An afocal beam-expander is provided and is located between the laser-source and the aspheric focusing lens. The afocal beam-expander is arranged to expand the collimated beam from the first diameter to a second diameter. The second diameter is greater than the clear-aperture of the aspheric focusing lens such that only a portion of the expanded collimated beam is inside the clear-aperture. The aspheric focusing lens focuses the portion of the beam of pulsed laser-radiation inside the clear aperture. The focused beam has an elongated focus coaxial with the optical axis. The elongated focus has an about uniform intensity distribution along the optical axis. The elongated focus overlaps the brittle material between the entrance surface and the exit surface.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1A:
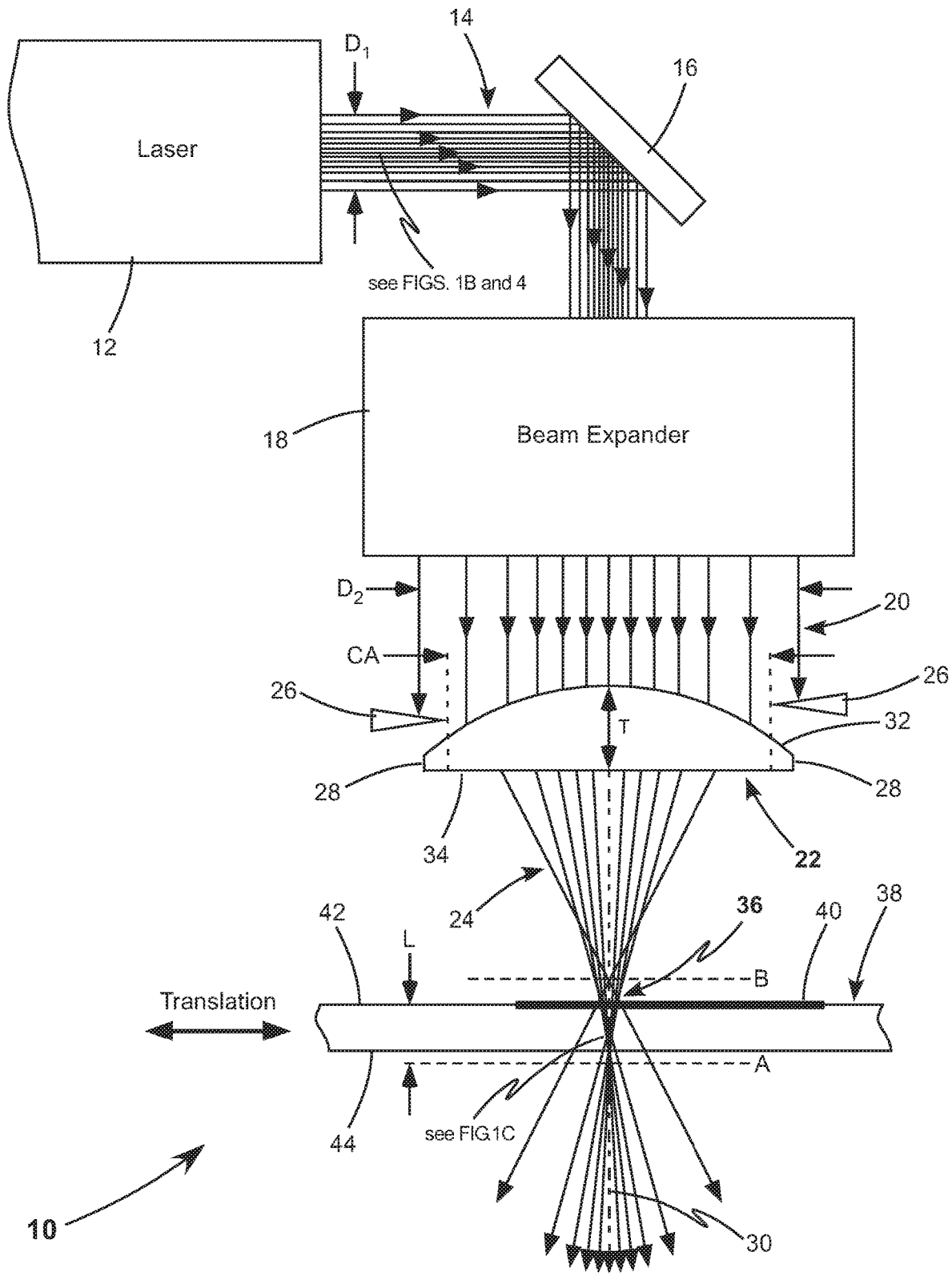
FIG. 1A schematically illustrates one preferred embodiment of laser-cutting apparatus in accordance with the present invention for creating extended defects in a workpiece made of a brittle material, the apparatus including a laser-source delivering a beam of pulsed laser-radiation, an afocal beam-expander, and an aspheric focusing lens forming an elongated focus having a uniform intensity distribution.

Referring now to the drawings, wherein like components are designated by like numerals, FIG. 1A schematically illustrates one preferred embodiment 10 of laser-cutting apparatus in accordance with the present invention. Apparatus 10 includes laser-source 12 that delivers a collimated beam of pulsed laser-radiation 14 having a beam-diameter "$D_1$". Collimated beam 14 is directed by an optional turning mirror 16 into an afocal beam-expander 18, which is arranged to intercept collimated beam 14 and to form an expanded beam of pulsed laser-radiation 20 that is collimated and has a larger beam-diameter "$D_2$". Afocal beam-expanders are a well-known beam-expanding element in the art of optical design and a description thereof is not necessary for understanding the principles of the present invention.

An aspheric focusing lens 22 is arranged to intercept expanded collimated beam 20 and form a focused beam of pulsed laser-radiation 24. Beam-diameter $D_2$ is selected to overfill the clear aperture "CA" of aspheric focusing lens 22 ($D_2$>CA). Only a portion of expanded collimated beam 20 is inside clear aperture CA. That portion is transmitted through aspheric focusing lens 22 and is formed into focused beam 24. A smaller complementary portion, comprising peripheral rays of expanded collimated beam 20, is not focused by aspheric focusing lens 22. Clear aperture CA of aspheric focusing lens 22 may be defined by a discrete aperture 26, which is located between afocal beam-expander 18 and aspheric focusing lens 22, and physically blocks the peripheral rays as depicted. Alternatively, clear aperture CA may be defined by edge 28 of aspheric focusing lens 22, which may be an optical edge thereof or a physical edge thereof.

Aspheric focusing lens 22 has an optical axis 30, an aspheric surface 32 and an opposite surface 34. Aspheric surface 32 has a convex aspheric shape that is described in detail herein below. Surface 34 may be flat or may have a convex shape that is spherical or aspheric. Aspheric focusing lens 22 is preferably a plano-convex lens having a flat surface 34. Aspheric focusing lens 22 may be oriented as depicted, having expanded collimated beam 20 incident on aspheric surface 32, or may be oriented having expanded collimated beam 20 incident on surface 34. For the preferred plano-convex aspheric focusing lens 22, the orientation having expanded collimated beam 20 incident on the flat surface 34 has an advantage that the focusing properties of the aspheric focusing lens are not sensitive to the precise thickness "T" of the lens.

Focused beam 24 converges to an elongated focus 36 along optical axis 30. Paraxial rays that emerge from aspheric focusing lens 22 proximate to optical axis 30 converge to a plane "A", which is perpendicular to optical axis 30. A "nominal focal length" for aspheric focusing lens 22 is defined as the distance between aspheric focusing lens 22 and plane A. Rays that emerge from aspheric focusing lens 22 proximate to edge 28 converge to a plane "B", which is closer to the aspheric focusing lens than plane A. Elongated focus 36 extends between planes A and B. Elongated focus 36 has a uniform intensity distribution along optical axis 30, between planes A and B, which is described in detail herein below.

A workpiece 38 made of a brittle material is located such that optical axis 30 intercepts a cutting line 40 indicated in the drawing by a bold line. Focused beam 24 enters workpiece 38 through an entrance surface 42 and exits workpiece 38 through an opposite exit surface 44. Workpiece 38 is located such that elongated focus 36 overlaps workpiece 38 between entrance surface 42 and exit surface 44. A "nominal depth-of-focus" in workpiece 38 "L" is defined as the distance between entrance surface 42 and plane A. Workpiece 38 may be situated completely within elongated focus 36, having both surfaces 42 and 44 located between planes A and B, as depicted. Alternatively, workpiece 38 may situated partially within elongated focus 36, without departing from the spirit and scope of the present invention. Cutting is accomplished by translating workpiece 38 as depicted, tracing optical axis 30 along cutting line 40 while applying focused beam of pulsed laser-radiation 24. Cutting line 40 may be straight or curved, as required by the application.

Figure 1B:
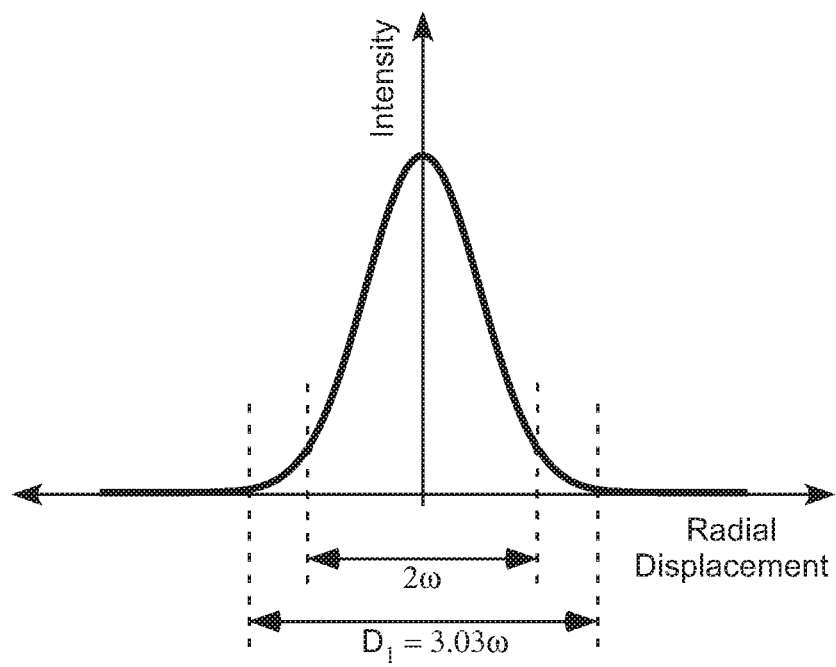
FIG. 1B schematically illustrates a transverse Gaussian intensity distribution in the beam of pulsed laser-radiation of FIG. 1A.

FIG. 1B schematically illustrates a cross-sectional intensity distribution for collimated beam 14. FIG. 1B is a graph of intensity of laser-radiation as a function of radial displacement from the center of collimated beam 14. Optical resonators in many laser-sources have a lowest-order transverse mode described by the Gaussian function. Such a transverse Gaussian intensity distribution is depicted in the drawing and has a beam-radius "ω" corresponding to $$13.5\% \left(\frac{1}{e^2}\right)$$

of the maximum intensity at the center of the beam. Beam-diameter $D_1$ is defined herein as diameter 3.03ω that contains 99% of the power in collimated beam 14 for convenience of illustration. Similarly, beam-diameter $D_2$ contains 99% of the power in expanded collimated beam 20.

Figure 1C:
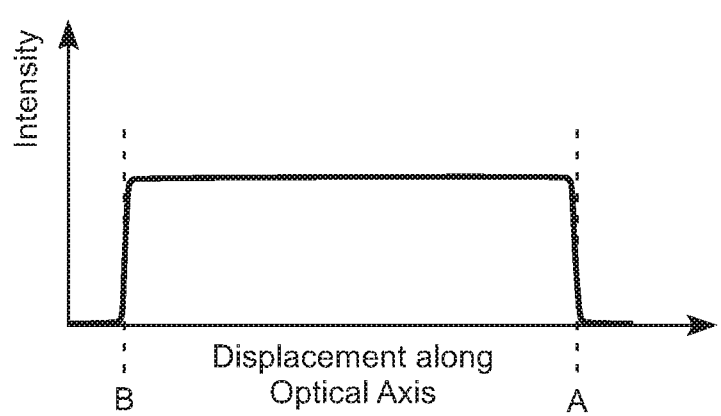
FIG. 1C schematically illustrates the uniform intensity distribution in the elongated focus of FIG. 1A.

FIG. 1C schematically illustrates a uniform intensity distribution for focused beam 24 along optical axis 30. Elongated focus 36 has an about-constant intensity between planes A and B in the drawing. In practice, intensity distributions formed by the present invention are "about uniform", as discussed herein below.

Figure 2:
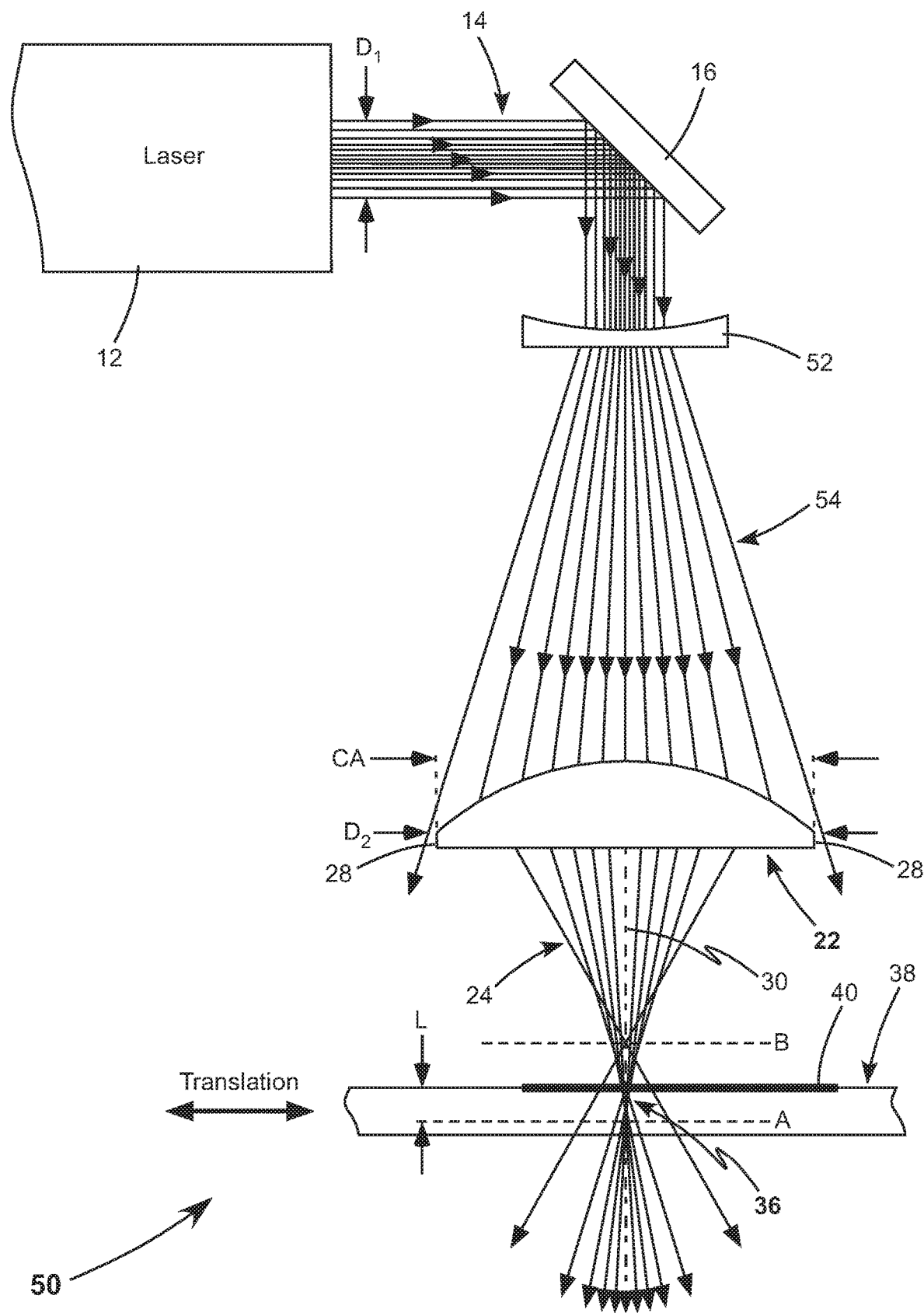
FIG. 2 schematically illustrates another preferred embodiment of laser-cutting apparatus in accordance with the present invention, similar to the embodiment of FIG. 1A, but wherein the afocal beam-expander is replaced by a negative lens.

FIG. 2 schematically illustrates another preferred embodiment 50 of laser-cutting apparatus in accordance with the present invention. Apparatus 50 is similar to laser-cutting apparatus 10 of FIG. 1A, but afocal beam-expander 18 is replaced by a negative lens 52 as the beam-expanding element. Negative lens 52 intercepts collimated beam 14 and forms an expanded beam of pulsed laser-radiation 54, which is diverging and overfills the clear aperture "CA" of aspheric focusing lens 22. FIG. 2 depicts an example of aperture CA being defined by edge 28 of aspheric focusing lens 22. Aspheric focusing lens 22 is arranged to intercept expanded diverging beam 54 and form focused beam 24. The drawing depicts an example of workpiece 38 being partially situated within elongated focus 36. In this example, nominal depth-of-focus L is less than the thickness of workpiece 38.

Figure 3:
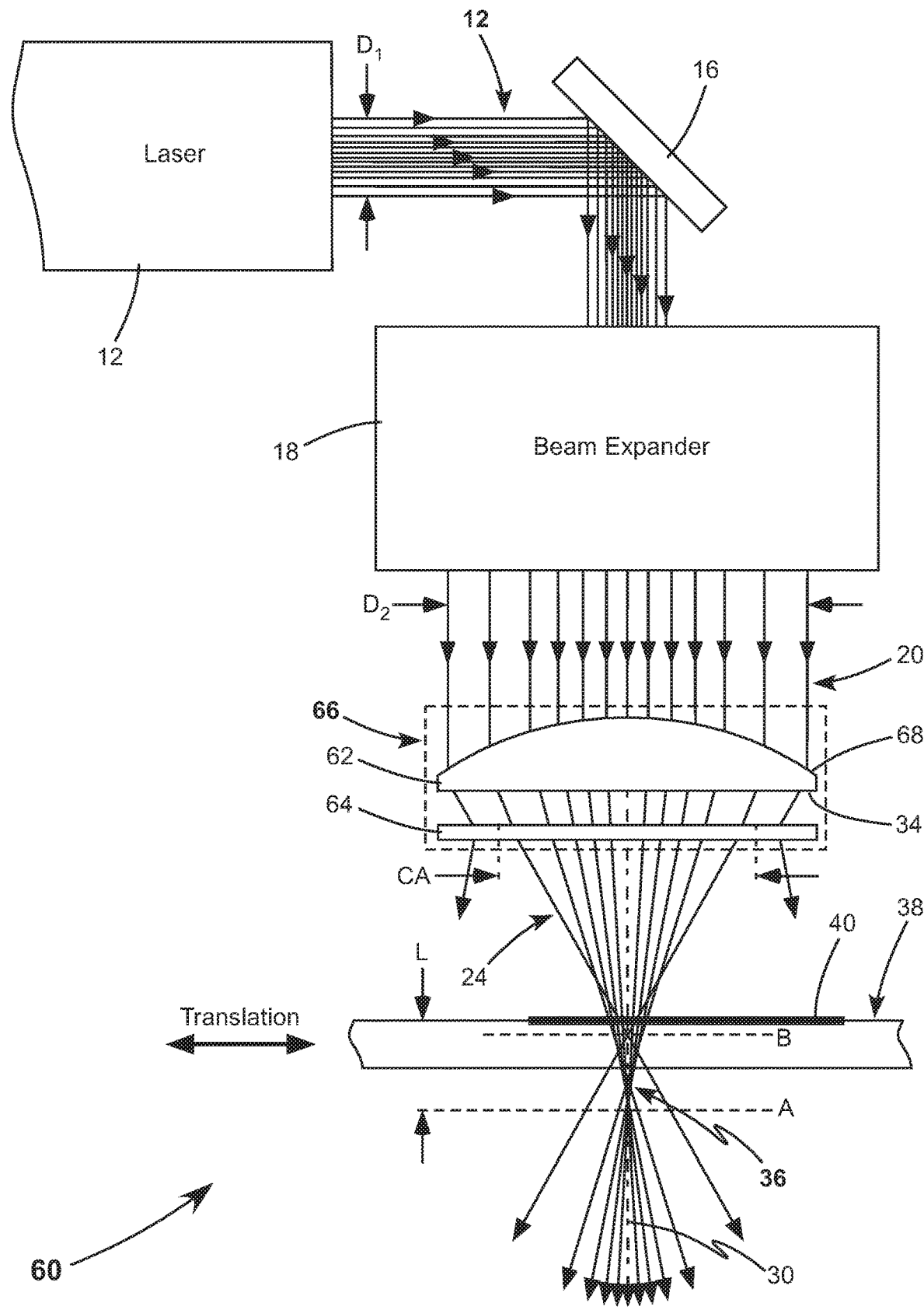
FIG. 3 schematically illustrates yet another preferred embodiment of laser-cutting apparatus in accordance with the present invention, similar to the embodiment of FIG. 1A, but wherein the aspheric focusing lens includes a spherical focusing lens and an aspheric phase plate.

FIG. 3 schematically illustrates yet another preferred embodiment 60 of laser-cutting apparatus in accordance with the present invention. Apparatus 60 is similar to laser-cutting apparatus 10 of FIG. 1A, but aspheric focusing lens 22 is replaced by a spherical focusing lens 62 and an aspheric phase plate 64, which together form an aspheric focusing lens 66. Spherical focusing lens 62 has a spherical surface 68 and opposite surface 34. Spherical surface 68 has a convex spherical shape. Spherical focusing lens 62 and aspheric phase plate 64 cooperatively form focused beam 24 having elongated focus 36. The drawing depicts another example of workpiece 38 being partially situated within elongated focus 36. In this example, nominal depth-of-focus L is greater than the thickness of workpiece 38.

Aspheric phase plate 64 is preferably a diffractive optical element (DOE) that modifies the wavefront of the focused beam propagating from spherical focusing lens 62 to form elongated focus 36 along optical axis 30. Aspheric phase plate 64 is customized to match the specific design of spherical focusing lens 62. Laser-cutting apparatus 60 has an advantage that spherical focus lens 62 may be a standard plano-convex lens obtained from a commercial optics supplier.

DOEs are commercially available, for example from RPC Photonics Inc. of Rochester, N.Y. Active DOEs (also known as "spatial light modulators") having programmable wavefront modulation are also commercially available, for example from HoloEye of Berlin, Germany. Using an active DOE for aspheric phase plate 64 enables apparatus 60 to laser-cut workpieces made of different materials or having different thickness without exchanging any optical elements. An aperture may be incorporated into the design of aspheric phase plate 64, if required, to restrict clear aperture CA.

Figure 4:
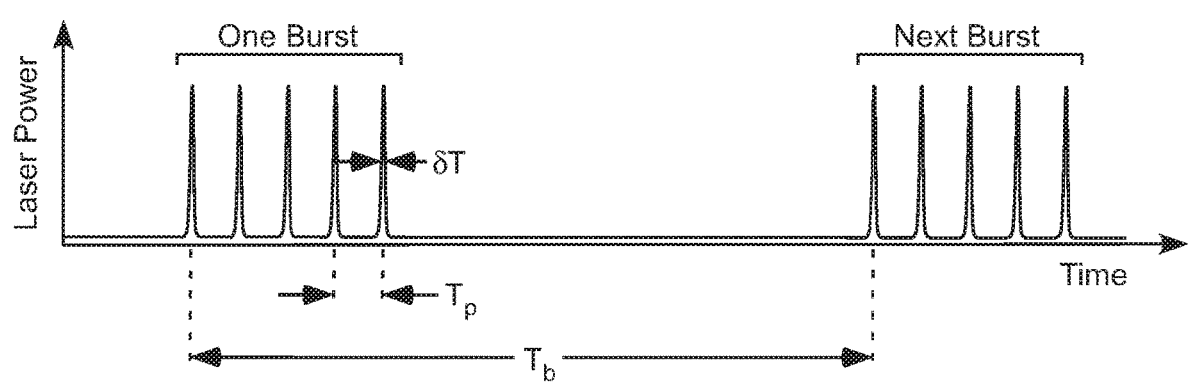
FIG. 4 is a timing diagram schematically illustrating pulses in the beam of laser-radiation of FIG. 1A.

FIG. 4 is a timing diagram schematically illustrating bursts of ultra-short pulses in collimated beam of pulsed laser-radiation 14 of FIG. 1A. An "ultra-short" pulse is defined herein as having a pulse-duration "δT" of less than about 20 picoseconds (ps). In general, shorter pulse durations produce cut workpieces having better edge quality. For example, edges formed using pulses having δT of a few-hundred femtoseconds have lower surface roughness than edges formed using pulses having δT of a few tens of picoseconds.

Individual pulses within a burst are separated by time interval "$T_p$" and successive bursts are separated by time interval "$T_b$", which is the separation between the first pulse of one burst and the first pulse of the next burst. These time intervals correspond, respectively, to a pulse-repetition-rate and a burst-frequency. The burst-frequency and the translation speed of the workpiece determine the spacing of defects along the cutting line. For a workpiece made of a specific material having a specific thickness, there is an optimum spacing of defects to achieve the best edge quality.

Preferably, there are between 2 and 10 pulses per burst, and most preferably there are 5 pulses per burst. Preferably, the pulse-repetition-rate is greater than about 10 megahertz (MHz). Most preferably, the pulse-repetition-rate is between about 40 MHz and about 50 MHz. Preferably, the burst-frequency is between about 50 kilohertz (kHz) and about 1 MHz. Most preferably, the burst-frequency is between about 100 kHz and about 400 kHz.

A suitable laser-source 12 for use in laser-cutting apparatus 10 of FIG. 1, 50 of FIG. 2, and 60 of FIG. 3 is a HyperRapid 50 HE laser-system available from Coherent Inc. of Santa Clara, Calif. This laser-system uses a master oscillator power amplifier (MOPA) architecture to deliver bursts of ultra-short pulses having an energy of more than 200 micro-joules OA at a burst-frequency up to 200 kHz, which corresponds to a maximum accessible average power of more than 40 Watts (W). Up to 10 pulses per burst are generated with a pulse-repetition-rate of about 50 MHz. The output beam of pulsed laser-radiation has a typical pulse duration of 10 ps and a wavelength of about 1064 nanometers (nm). The HyperRapid 50 HE laser-system includes an acousto-optic modulator (AOM) that may be used as a process shutter. The laser-system provides a continuous train of bursts while the AOM is open.

Figure 5:
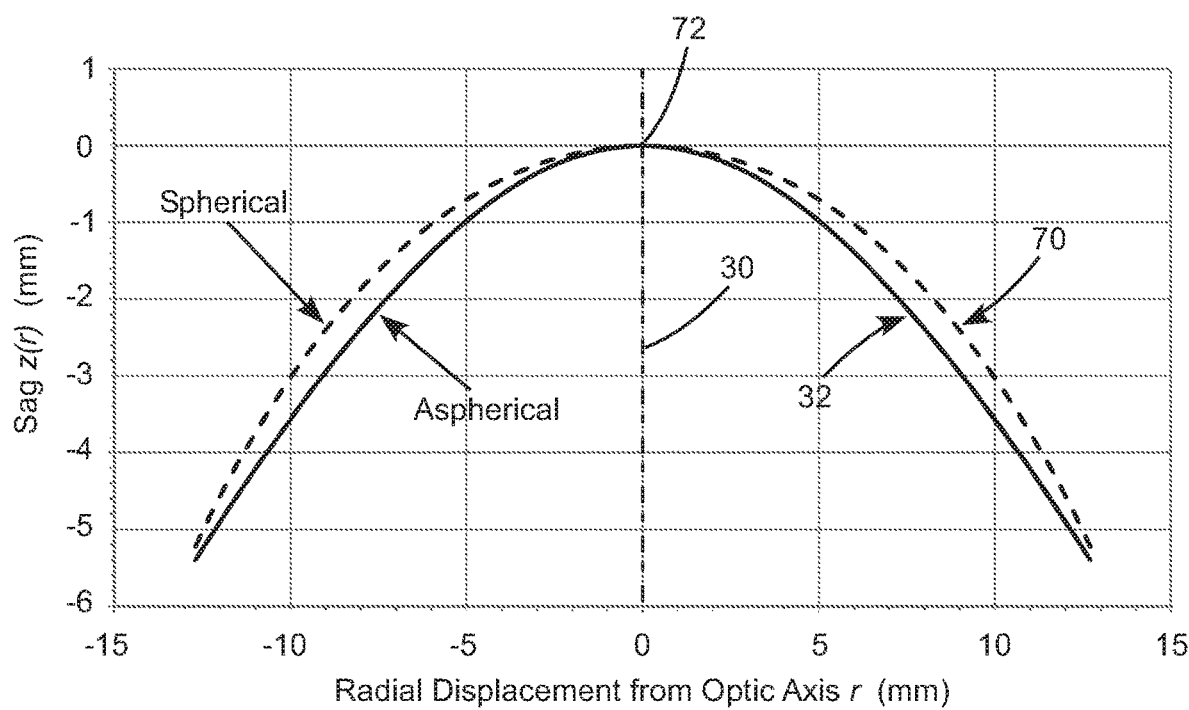
FIG. 5 is a graph schematically illustrating cross-sectional shapes of an aspheric surface of an aspheric focusing lens in accordance with the present invention and a spherical surface of a commercial spherical lens, the vertices of the surfaces located at the origin, the surfaces illustrated by sag as a function of radial displacement from the optical axis.

FIG. 5 schematically illustrates an exemplary aspheric surface 32 of aspheric focusing lens 22 for use in laser-cutting apparatus 10 of FIG. 1A. Surface 34 is flat. The precise shape of exemplary aspheric surface 32 (solid line) is illustrated in cross-section by displacement parallel to optical axis 30 (known in the optics art as "sag") as a function of radial displacement from optical axis 30. For comparison, FIG. 5 includes the precise shape of a spherical surface 70 (dotted lines) of a commercial spherical plano-convex lens having sag close to that of aspheric surface 32. The commercial spherical plano-convex lens is part number LA1027 from Thorlabs of Newton, N.J. Thorlabs lens LA1027 has a specified focal length of +35 millimeters (mm). The Vertex 72 of each surface is located at the origin of the drawing. Equations for calculating the precise shapes of aspheric surface 32 and spherical surface 70 are presented herein below.

Figure 6A:
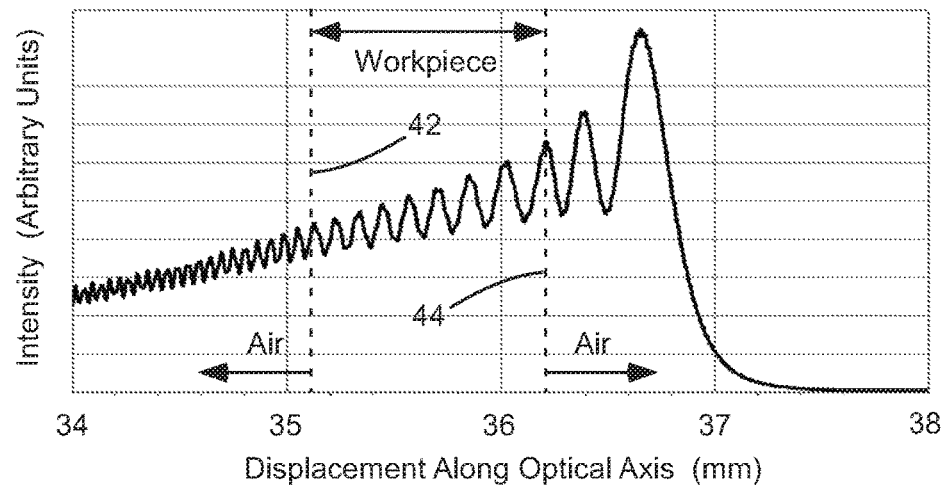
FIG. 6A is a graph schematically illustrating calculated intensity as a function of displacement along the optical axis of a traditional laser-cutting apparatus similar to the embodiment of FIG. 2, but having a spherical plano-convex focusing lens instead of the aspheric focusing lens of the present invention, the spherical plano-convex focusing lens having a specified focal length of +35 mm.

FIG. 6A is a graph schematically illustrating calculated intensity as a function of displacement along optical axis 30 near the focus of a typical laser-cutting apparatus. The typical laser-cutting apparatus is similar to laser-cutting apparatus 50 of FIG. 2, but has a spherical plano-convex focusing lens having a spherical convex surface instead of aspheric focusing lens 22 having aspheric surface 32. The calculation uses Thorlabs lens LA1027 having spherical surface 70, which is depicted in FIG. 5. Negative lens 52 is part number LC1120 from Thorlabs, which has a specified focal length of −100 mm. Locations of entrance surface 42 and exit surface 44 for an exemplary workpiece 38 are indicated by vertical dotted lines in FIG. 6A. Exemplary workpiece 38 has a refractive index of 1.51 and a thickness of 1.1 mm. Both Gorilla™ Glass (which is a chemically strengthened glass supplied by Corning Inc. of Corning, N.Y.) and BK7 glass (which is a commonly available commercial glass) have a refractive index of about 1.51.

Spherical aberration imparted onto the focused beam by Thorlabs lens LA1027 produces an elongated focus, which is manifest in FIG. 6A as the intensity distributed over an extended range along the optical axis, from less than 34 mm to about 37 mm. Without spherical aberration, the intensity distribution would instead be a single peak centered at about 36.6 mm. Although the whole thickness of the exemplary workpiece is exposed to the pulsed beam of laser-radiation, much of the pulse energy is delivered outside of the exemplary workpiece, which is inefficient.

Figure 6B:
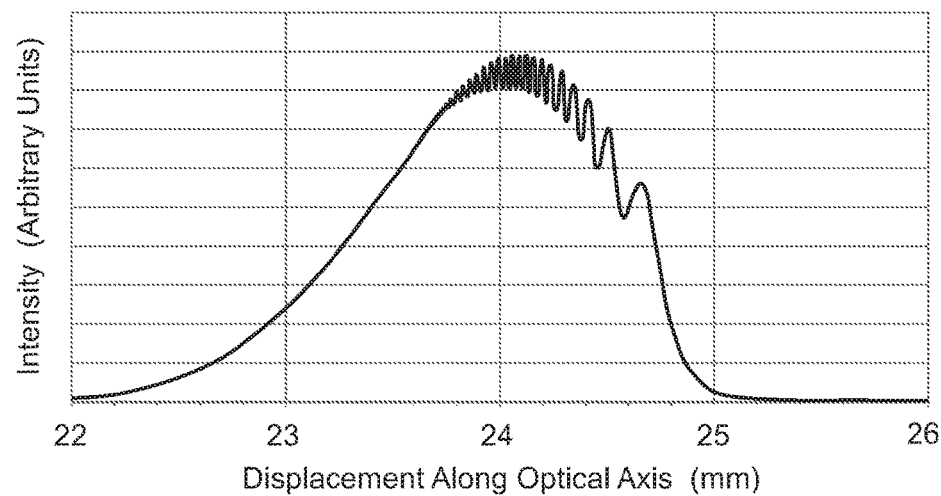
FIG. 6B is a graph schematically illustrating calculated intensity as a function of displacement along the optical axis of the laser-cutting apparatus of FIG. 1A, the aspheric focusing lens having a nominal focal length of +25 mm and the beam of pulsed laser-radiation underfilling the clear aperture of the aspherical focusing lens.

FIG. 6B is a graph schematically illustrating calculated intensity as a function of displacement along optical axis 30 near elongated focus 36 of laser-cutting apparatus 10 of FIG. 1A. A simple aspheric focusing lens 22 has focal length "AO", which depends linearly on radial displacement "r" from optical axis 30 for rays within expanded collimated beam 20:

$$f(r) = f(o) - \Delta f \cdot r, \quad (1)$$

where "f(0)" is the nominal focal length and "Δf" is a constant. The simple aspheric focusing lens producing the intensity distribution depicted in FIG. 6B has a nominal focal length f(0) of 25 mm, a constant Δf of 0.16, and a clear aperture CA of 50 mm. Expanded collimated beam 20 has a Gaussian beam-diameter 2ω of 25 mm. The focus depicted in FIG. 6B is elongated, but over a smaller range along the optical axis than the elongated focus depicted in FIG. 6A, which enables a much higher fraction of the pulse energy to be delivered to a workpiece. FIG. 6B demonstrates an advantage of aspheric focusing lens 22 in the present invention.

Figure 6C:
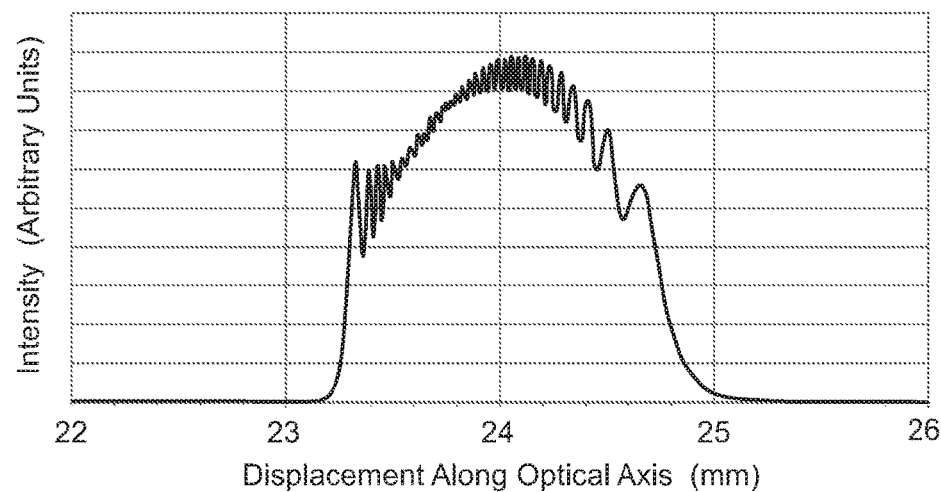
FIG. 6C is a graph schematically illustrating calculated intensity as a function of displacement along the optical axis of the same laser-cutting apparatus as FIG. 6B, but the beam of pulsed laser-radiation overfilling the clear aperture of the aspheric focusing lens.

FIG. 6C is a graph schematically illustrating calculated intensity as a function of displacement along optical axis 30 in laser-cutting apparatus 10 of FIG. 1A, including the simple aspheric focusing lens 22 used to calculate FIG. 6B, but having a smaller clear aperture CA of 25 mm. Although the smaller clear aperture prevents 13.5% of the pulse energy from reaching workpiece 38, diffraction at the edges of aperture 26 forms a more uniform intensity distribution along optical axis 30 compared to FIG. 6B. The elongated focus in FIG. 6B is better defined than the elongated focus depicted in FIG. 6B, extending from a displacement of about 23.2 mm to a displacement of about 24.8 mm. FIG. 6C demonstrates an advantage of aperture 26 in combination with aspheric focusing lens 22 in the present invention.

Figure 7A:
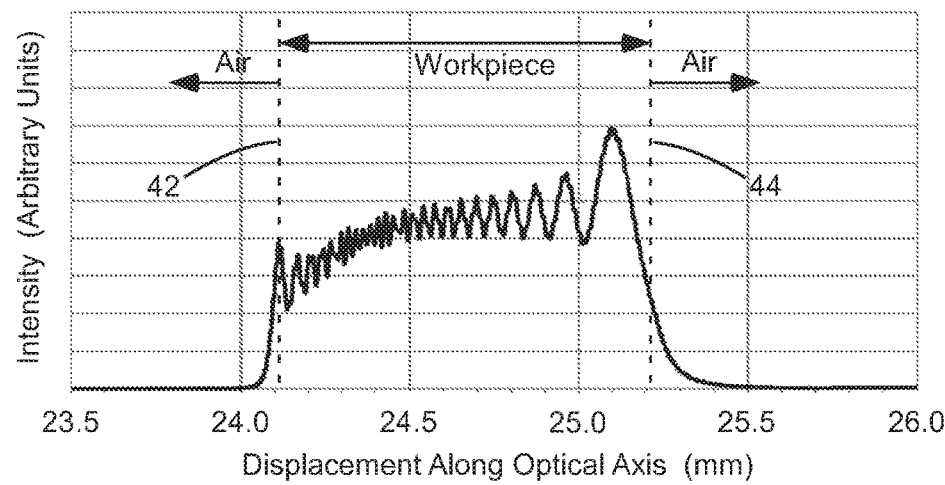
FIG. 7A is a graph schematically illustrating calculated intensity as a function of displacement along the optical axis of the laser-cutting apparatus of FIG. 1A, having about 5% of the pulse energy in the beam of laser-radiation outside the clear aperture of the aspheric focusing lens.

FIG. 7A is a graph schematically illustrating calculated intensity as a function of displacement along optical axis 30 near elongated focus 36 of laser-cutting apparatus 10 of FIG. 1A, having exemplary aspheric surface 32 depicted in FIG. 5. Expanded collimated beam 20 has a Gaussian beam-diameter 2ω of 25 mm and aperture 26 has a diameter of 30.6 mm. Aperture 26 prevents about 5% of the pulse energy in expanded collimated beam 20 from reaching exemplary workpiece 38, which has a refractive index of 1.51 and a thickness of 1.1 mm.

Exemplary aspheric surface 32 depicted in FIG. 5 is designed to form an elongated focus within the exemplary workpiece, delivering the pulse energy to the exemplary workpiece with minimal losses. In FIG. 7A, nearly all of the laser-radiation is delivered to the elongated focus between a displacement of about 24.1 mm and a displacement of about 25.2 mm, thereby exposing the full thickness of the exemplary workpiece. Aspheric focusing lens 22 having exemplary aspheric surface 32 is designed to be oriented having expanded collimated beam 20 incident on flat surface 34 and focused beam 24 emerging from exemplary aspheric surface 32. Aspheric focusing lens 22 is made of BK7 glass, having a refractive index of 1.51 for radiation having a wavelength of 1.064 μm.

Figure 7B:
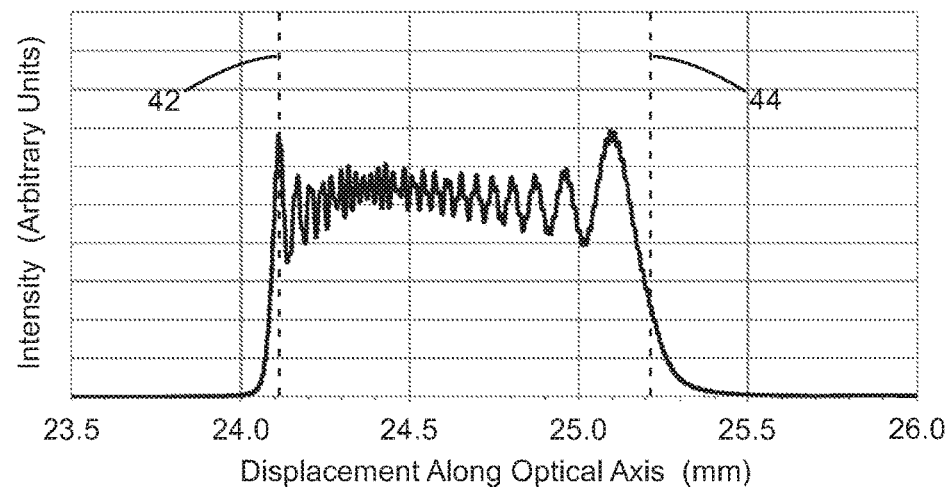
FIG. 7B is a graph schematically illustrating calculated intensity as a function of displacement along the optical axis of the same laser-cutting apparatus as FIG. 7A, but having about 10% of the pulse energy in the beam of laser-radiation outside the clear aperture of the aspheric focusing lens.
Figure 7C:
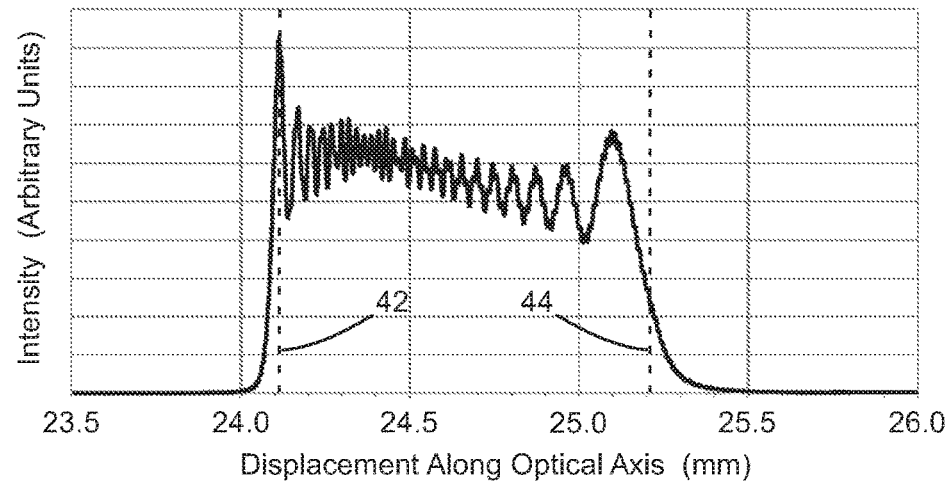
FIG. 7C is a graph schematically illustrating calculated intensity as a function of displacement along the optical axis of the same laser-cutting apparatus as FIG. 7A, but having about 15% of the pulse energy in the beam of laser-radiation outside the clear aperture of the aspheric focusing lens.

FIGS. 7A, 7B, and 7C illustrate intensity along optical axis 30 in laser-cutting apparatus 10 of FIG. 1A having exemplary aspheric surface 32, wherein aperture 26 has respective diameters of 30.6 mm, 25.0 mm, and 24.3 mm. Aperture 26 prevents respectively about 5%, about 10%, and about 15% of the pulse energy from reaching exemplary workpiece 38. FIG. 7A has a maximum intensity peak located near exit surface 44. FIG. 7B has an about uniform intensity distribution. FIG. 7C has a maximum intensity peak located at the entrance surface 42. FIGS. 7A, 7B, and 7C depict how the intensity distribution in elongated focus 36 may be tailored to optimize cutting of a specific workpiece 38. The portion of expanded collimated beam 20 that is inside clear aperture CA is preferably between about 85% and about 95%, and is most preferably about 90%.

Each of the calculated intensity distributions depicted in FIGS. 7A, 7B, and 7C has a plurality of peaks imposed on an overall uniform intensity distribution. These high-frequency peaks or modulations in intensity are caused by optical interference of the coherent laser-radiation within focused beam 24. Peaks in calculated intensity along elongated focus 36 approximately correspond to modulations observed in the extended defects created in workpieces using the present invention. Similarly, valleys in calculated intensity sometimes correspond to discontinuities in an extended defect.

Material exposed to a peak in an intensity distribution exceeds thresholds for controlled defect formation and for unwanted defect formation at lower pulse energies than material exposed to lower intensities. It is therefore useful to consider the peak intensities when processing a brittle material. A "uniform intensity distribution" herein refers to an intensity distribution having an overall shape that varies by less than about 20% from the mean intensity, without consideration of high-frequency peaks caused by optical interference. An "about uniform intensity distribution" is defined herein as an intensity distribution having peak intensities that vary by less than about 20% from the mean peak intensity.

Returning now to FIG. 5, the precise shape of aspheric surface 32 is defined by a set of aspheric parameters "β" and a radius parameter "R". Each point on aspheric surface 32 has sag:

$$z(r) = \frac{r^2}{R\left(1 + \sqrt{1 - \left(\frac{r}{R}\right)^2}\right)} + \beta_1 \cdot r + \beta_2 \cdot r^2 + \beta_3 \cdot r^3 + \beta_4 \cdot r^4 + \beta_5 \cdot r^5 + \beta_6 \cdot r^6 + \beta_7 \cdot r^7 + \beta_8 \cdot r^8. \quad (2)$$

The precise sag of exemplary aspheric surface 32 in units of millimeters is defined by: $R=22.6$ mm, $\beta_1=3.838\times10^{-4}$, $\beta_2=-6.330\times10^{-2}$ mm$^{-1}$, $\beta_3=8.990\times10^{-5}$ mm$^{-2}$, $\beta_4=4.500\times10^{-5}$ mm$^{-3}$, $\beta_5=1.424\times10^{-6}$ mm$^{-4}$, $\beta_6=-4.250\times10^{-7}$ mm$^{-5}$, $\beta_7=2.200\times10^{-8}$ mm$^{-6}$, and $\beta_8=-4.650\times10^{-10}$ mm$^{-7}$. The precise sag of spherical surface 70 in units of mm is:

$$z(r) = \frac{r^2}{R\left(1 + \sqrt{1 - \left(\frac{r}{R}\right)^2}\right)}, \quad (3)$$

where $R=-18.05$ mm. For a spherical surface, R corresponds to the physical radius of the surface.

In summary, a beam of pulsed laser-radiation is focused to form an elongated focus having a uniform intensity distribution for cutting a brittle material. The embodiments described above use an aspheric focusing lens and an aperture to form the elongated focus from a beam of pulsed laser-radiation having a transverse Gaussian intensity distribution. The optical design can be optimized to efficiently focus the laser-radiation through the full thickness of the brittle material, thereby creating extended defects that enable the brittle material to be cut in a single pass along a cutting line. The controlled and efficient delivery of the laser-radiation to create extended defects reduces the pulse energy and time required to cut workpieces made of hard brittle materials, such as strengthened glass. The present invention does not rely on creating a self-guiding filament to create each extended defect. The invention is therefore relatively insensitive to the beam properties of the source of pulsed laser-radiation.

The present invention is described above in terms of a preferred embodiment and other embodiments. The invention is not limited, however, to the embodiments described and depicted herein. Rather, the invention is limited only by the claims appended hereto.

What is claimed is:

1. A method for cutting a workpiece made of a brittle material along a cutting line, comprising the steps of:
   delivering a beam of laser radiation, the laser radiation being pulsed and having a pulse duration of less than about 20 picoseconds;
   expanding the beam of laser radiation to overfill a clear aperture of an aspheric focusing lens such that only a portion of the expanded beam of laser radiation is inside and fills the clear aperture and is transmitted through the aspheric focusing lens;
   forming a focused beam of laser radiation having an elongated focus by focusing the transmitted beam of laser radiation in combination with diffracting the beam of laser radiation at an edge of the clear aperture, the elongated focus having an about uniform intensity distribution along an optical axis of the aspheric focusing lens;
   locating the workpiece such that the elongated focus overlaps the workpiece between an entrance surface and an exit surface thereof and the optical axis intercepts the cutting line; and
   tracing the optical axis along the cutting line.

2. The cutting method of claim 1, wherein the portion of the expanded beam of laser radiation inside the clear aperture is between about 85% and about 95%.

3. The cutting method of claim 1, wherein the about uniform intensity distribution includes a plurality of peaks, the peak intensities varying by less than about 20% from the mean peak intensity.

4. The cutting method of claim 1, wherein the elongated focus extends from the entrance surface to the exit surface.

5. The cutting method of claim 1, wherein the delivered beam of laser radiation has a pulse energy, the design of the aspheric focusing lens maximizing a fraction of the pulse energy within the elongated focus.

6. The cutting method of claim 1, wherein the clear aperture is defined by a discrete aperture located in the expanding beam of laser radiation.

7. The cutting method of claim 1, wherein the clear aperture is defined by an edge of the aspheric focusing lens.

8. The cutting method of claim 1, wherein the aspheric focusing lens is a plano- convex lens, having a convex aspheric surface and an opposite flat surface.

9. The cutting method of claim 8, wherein the aspheric focusing lens is oriented such that the expanded beam of laser radiation is incident on the convex aspheric surface.

10. The cutting method of claim 8, wherein the aspheric focusing lens is oriented such that the expanded beam of laser radiation is incident on the flat surface.

11. The cutting method of claim 1, wherein the aspheric focusing lens includes a spherical focusing lens and an aspheric phase plate.

12. The cutting method of claim 11, wherein the aspheric phase plate is a diffractive optical element.

13. The cutting method of claim 1, wherein the beam of laser radiation is expanded by an afocal beam expander.

14. The cutting method of claim 1, wherein the beam of laser radiation is expanded by a negative lens.

15. The cutting method of claim 1, wherein the optical axis is traced along the cutting line by translating the workpiece.

16. The cutting method of claim 1, wherein the delivered beam of laser radiation has bursts of pulses, each burst containing a plurality of individual pulses.

17. The cutting method of claim 1, wherein the brittle material is a glass.

18. The cutting method of claim 17, wherein the glass is chemically strengthened.

19. The cutting method of claim 1, wherein extended defects are created in the workpiece by the laser radiation within the elongated focus.

20. The cutting method of claim 19, wherein each extended defect is created by a self-guiding filament.

* * * * *